United States Patent [19]

Viets

[11] 4,392,621
[45] Jul. 12, 1983

[54] DIRECTIONAL CONTROL OF ENGINE EXHAUST THRUST VECTOR IN A STOL-TYPE AIRCRAFT

[76] Inventor: Hermann Viets, 144 Scenery Dr., Morgantown, W. Va. 26505

[21] Appl. No.: 251,695

[22] Filed: Apr. 7, 1981

[51] Int. Cl.$^3$ .................................. B64C 21/08
[52] U.S. Cl. ............................. 244/12.5; 244/204; 244/207; 244/52; 137/829; 239/265.23
[58] Field of Search .................. 244/12.5, 12.2, 12.1, 244/52, 51, 207, 208, 204, 201, 198, 209, 210, 212; 239/265.17, 265.19, 265.23, DIG. 7; 137/829, 832

[56] References Cited

U.S. PATENT DOCUMENTS

| | | | |
|---|---|---|---|
| 1,918,536 | 7/1933 | Griswold . | |
| 2,039,179 | 4/1936 | Mazzini | 244/12 |
| 2,077,071 | 4/1937 | Rose | 244/42 |
| 3,062,483 | 11/1962 | Davidson | 239/DIG. 7 |
| 3,262,658 | 7/1966 | Reilly | 244/207 |
| 3,697,020 | 10/1972 | Thompson | 244/207 |
| 3,807,663 | 4/1974 | Bartoe | 244/42 |
| 3,925,982 | 12/1975 | Mueller | 239/265.23 |
| 4,019,696 | 4/1977 | Hirt et al. | 244/42 |
| 4,030,687 | 6/1977 | Hapke | 244/12.5 |
| 4,069,977 | 1/1978 | Vaughan | 244/52 |
| 4,074,568 | 2/1978 | Viets | 73/147 |
| 4,146,197 | 3/1979 | Grotz | 244/12.5 |

FOREIGN PATENT DOCUMENTS 964101 8/1950 France .................. 244/210

Primary Examiner—Galen L. Barefoot
Attorney, Agent, or Firm—Donald J. Singer; John R. Flanagan

[57] ABSTRACT

A method and apparatus for controlling the direction of the thrust vector of the engine exhaust stream in an upper surface blowing type aircraft includes ducts in the aircraft wings having rotary control valves for controlling the flow of air through the ducts from a source of high pressure to the low pressure upper surface of the wing. Introduction of the airflow at the upper surface rearwardly of the jet engine produces separation of Coanda effect attachment of the engine exhaust stream from the curved upper wing surface. Coanda effect attachment deflects the exhaust stream over the wing and toward the ground and results in a predominantly vertical thrust vector which augments lift of the aircraft. However, separation of the exhaust stream from the upper surface results in a predominantly horizontal thrust vector which augments forward acceleration of the aircraft. The fluidic action of the valves can rapidly change the thrust vector between basically horizontal and highly inclined orientations.

9 Claims, 6 Drawing Figures

DIRECTIONAL CONTROL OF ENGINE EXHAUST THRUST VECTOR IN A STOL-TYPE AIRCRAFT

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to an upper surface blowing jet propulsion system in a STOL (short takeoff and landing) aircraft, and, more particularly, is concerned with a method and apparatus for controlling the direction of the thrust vector of the exhaust stream from the jet engine of the aircraft.

2. Description of the Prior Art

STOL aircraft are sometimes designed with an upper surface blowing jet propulsion system, such as illustrated and disclosed in U.S. Pat. No. 4,019,696. The jet engines are mounted above and forward of the longitudinal axis of the wings so that their exhaust streams travel over the upper surface of the wings and flaps, if any, forming the trailing edge of the wings. Due to the Coanda effect, defined as the tendency of a gas or fluid stream to follow a curved surface, the respective exhaust stream attaches itself to the upper surface of the associated wing and flaps, such as seen in FIG. 2 of the aforesaid patent, the flaps being in an extended state. The exhaust stream is thereby deflected toward the ground. The vector of the thrust produced by this arrangement lies in a direction opposite to the momentum of the jet exhaust stream and gains a vertical component due to the deflection. This vertical component of the thrust vector augments the normal aerodynamic lift provided by the wings and, thus, allows an upper surface blowing type aircraft to take off in relatively short distances.

During high speed (cruise) operation, the flaps of the upper surface blowing type aircraft are retracted and little or no exhaust stream attachment to the wings and retracted flaps occurs. Thus, during cruise the jet engine exhaust stream flows directly rearwardly, but still over the upper wing and flap surfaces. Consequently, the direction of the thrust vector during aircraft cruise is generally horizontal.

A horizontal thrust vector would also be advantageous as the plane accelerates down the runway approaching takeoff. If the exhaust stream was not deflected by the wing and flaps but rather was expelled in a horizontal direction, then maximum acceleration of the aircraft on the ground would result. This would allow the normal aerodynamic wing-generated lift to increase at a maximum rate. However, to then take advantage of the upper surface blowing characteristic of the aircraft for achieving short distance takeoff, the jet engine exhaust flow should be caused to attach to the upper surface of the wing and flaps at a point in the takeoff where the additional lift would yield a total lift sufficient for immediate takeoff. But most upper surface blowing type aircraft, by utilizing movable flaps to produce the curved surface to which the jet engine exhaust stream attaches, must mechanically deploy the flaps by unfolding or extending them which takes place too slowly to achieve deflection of the exhaust stream at the opportune moment. Consequently, conventional upper surface blowing designs cannot take advantage of the maximum horizontal thrust vector during takeoff.

SUMMARY OF THE INVENTION

The present invention maximizes horizontal thrust in the initial portion of the takeoff and yet achieves the required exhaust stream deflection at takeoff in a manner which obviates the need to mechanically deploy flaps or the like to cause Coanda attachment of the jet exhaust stream to the upper surface of the wing. Underlying the present invention is the recognition that the mere attempt to effectuate a rapid transition from a substantially horizontal to vertical thrust condition, or vice versa, by mechanically reshaping the upper surface of the wing and flaps was the real problem. The present invention proposes to set aside the mechanical approach and substitute a fluidic approach.

The present invention accepts, as a given unchangeable condition throughout the takeoff process, the presence of an upper surface having a curved configuration amenable to unaided Coanda effect attachment of the exhaust stream to the upper surface. The fluidic approach of the present invention instead focuses directly on controlling the extent of the Coanda effect attachment of the exhaust stream to the wing upper surface as a proper way to effectuate rapid and reliable control over the direction of the thrust vector of the jet engine exhaust stream. The need for reliability is readily apparent in cases where a long takeoff is not possible because of field constraints. The transition from the horizontal to vertical component of the thrust vector should be rapid in order to make maximum use of the horizontal thrust component. The fluidic approach to control of the direction of the exhaust stream thrust vector satisfies both the need for reliability and rapidity.

Accordingly, the present invention provides a method and apparatus for controlling the direction of the thrust vector of the engine exhaust stream in an upper surface blowing type aircraft by controlling the extent of Coanda effect attachment of the exhaust stream to the upper surface of the aircraft wing. Specifically, the exhaust stream is directed over the upper surface so as to cause Coanda effect attachment of the exhaust stream thereto. Then, selectively, a flow of air is introduced between the exhaust stream and the wing upper surface so as to cause separation of the exhaust stream from the surface at a desired region along the upper surface. The separation results by relieving the low pressure region on the upper surface of the wing which, by the Coanda effect, caused the initial attachment. On the one hand, the Coanda effect attachment deflects the exhaust stream over the wing upper surface and toward the ground, producing an increase in the vertical component and a decrease in the horizontal component of the thrust vector of the engine exhaust stream and thereby an increase in lift of the aircraft. On the other hand, by controllably detaching the exhaust stream from the upper surface of the wing, the vertical component of the thrust vector is decreased, while the horizontal component is increased, and thereby forward acceleration of the aircraft is increased. Three alternatives are proposed for the source of the air flow to the upper surface of the wing. In the first alternative, the flow of air is routed from a lower surface of the wing through at least one duct to the upper surface. In another embodiment, the flow of air is comprised by a small portion of the jet engine exhaust which is routed from the engine through at least one duct to the upper surface. In a final alternative, the flow of air is routed from an edge of the wing through at least one duct to the upper surface. Under any of these alternatives, the flow of air can be introduced at a plurality of locations along the upper surface of the wing for varying the point along the upper surface at which detachment of the exhaust stream from the upper surface takes place.

DETAILED DESCRIPTION OF THE INVENTION

Figure 1:
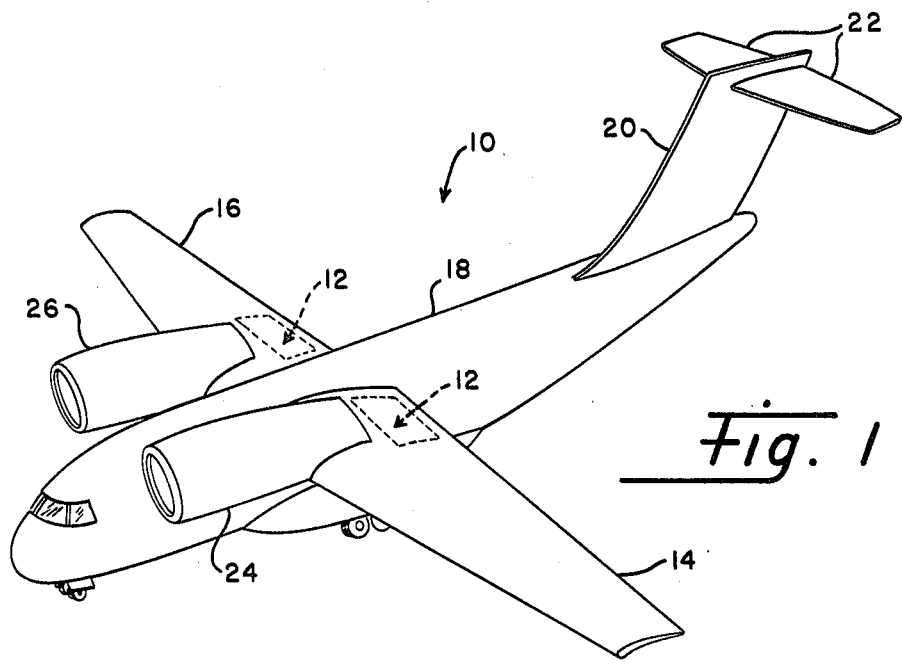
FIG. 1 is a perspective view of an upper surface blowing type aircraft to which the present invention may be applied.

Referring now to FIG. 1, there is illustrated an upper surface blowing type aircraft, generally designated 10, which incorporates the features comprising the present invention in the general area encompassed by dashed boxes 12 on wings 14, 16 of the aircraft. Besides the pair of wings 14, 16, the aircraft 10 includes a fuselage 18 to which a vertical stabilizer 20 as well as the wings are mounted, a horizontal stabilizer 22 mounted to the vertical stabilizer, and jet engines 24, 26 mounted forward and above the respective wings 14, 16 on either side of the fuselage 18. Since the features comprising the present invention incorporated in each of the wings immediately rearward of the jet engines are identical, the present invention need only be discussed hereinafter in connection with one wing and engine, it being understood that the discussion thereof equally applies to the other wing and engine. In FIGS. 2 through 6, the features of the present invention are discussed in connection with the left wing 14 and jet engine 24.

Figure 2:
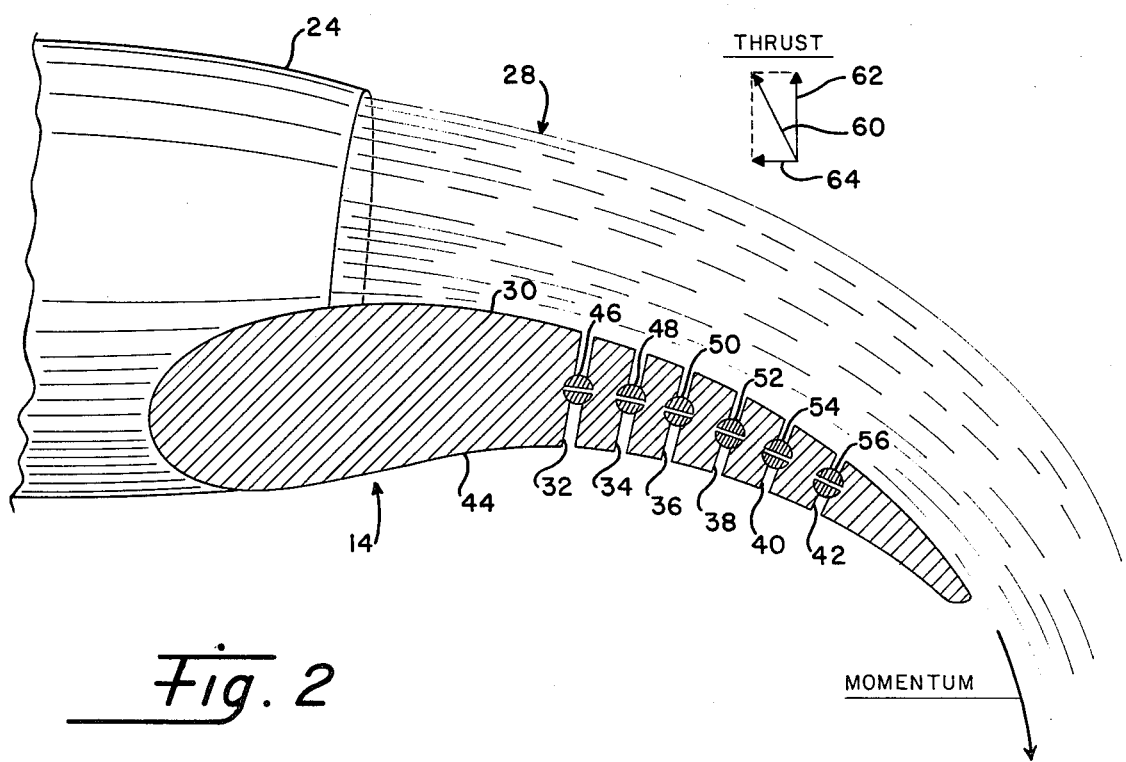
FIG. 2 is an enlarged fragmentary side elevational view, partly in section, of the jet engine and the wing of the aircraft of FIG. 1 as seen along line 2—2 of FIG. 4, with the first embodiment of the Coanda effect attachment control features of the present invention being illustrated when rendered inoperative.

As seen in FIG. 2, the jet engine 24 emits an exhaust stream 28 that flows over the wing 14. The wing 14 is shown without flaps along its rear portion; however, it should be understood that the wing may include one or more flaps such as illustrated in aforesaid U.S. Pat. No. 4,019,696. During high speed (cruise) operation, the flaps would be retracted or withdrawn, while during low speed operation the flaps are extended downwardly. An upper surface 30 of the wing 14 without flaps would have a permanent rearwardly and downwardly curved configuration, such as seen in FIG. 2. In the case of a wing with flaps, when the flaps were extended the configuration of the upper surfaces of the wing and flaps would take on the curvature of the wing 14 without flaps. Thus, in either case, the curved upper surface 30 causes deflection of the exhaust stream 28 of the engine 24 along a curved path over the upper surface 30 and toward the ground by Coanda effect attachment of the exhaust stream 28 to the upper surface 30.

Figure 3:
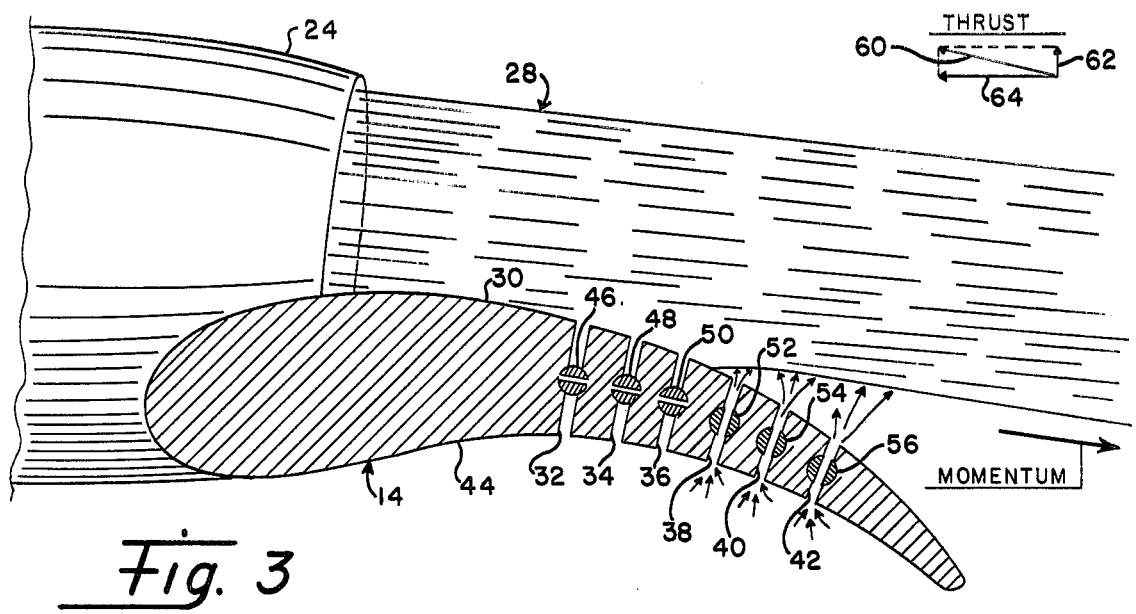
FIG. 3 is an enlarged fragmentary side elevational view, partly in section, of the jet engine and the wing similar to that of FIG. 2 but showing the first embodiment of the Coanda effect attachment control features when rendered operative.
Figure 4:
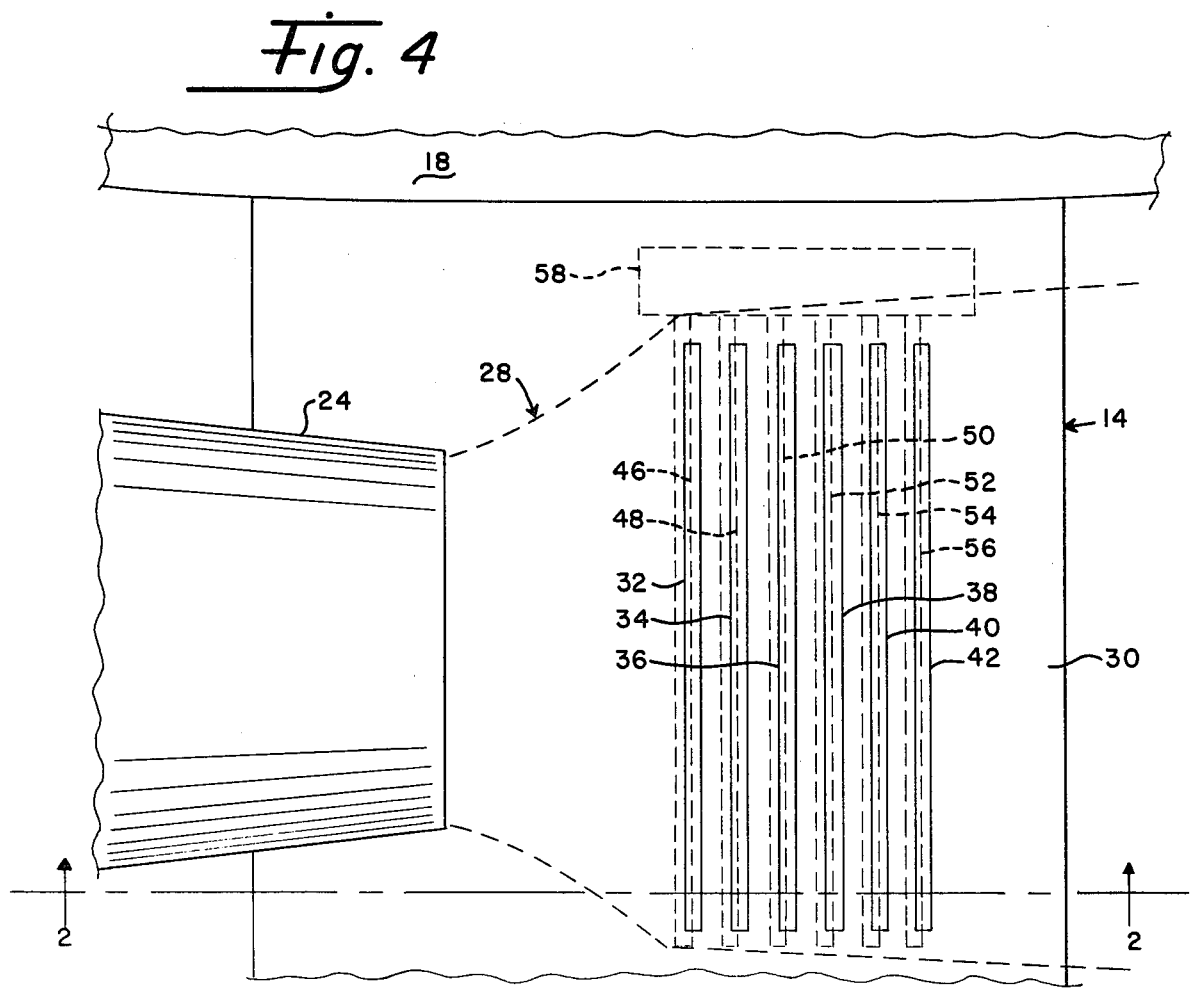
FIG. 4 is a top plan view of the fragmentary portion of the jet engine and wing illustrated in FIGS. 2 and 3.

The underlying approach of the present invention is to provide an upper surface wing design for achieving Coanda effect attachment (with or without extendible flaps) and then design in a fluidic technique to spoil the attachment when so desired. A first embodiment of the fluidic control features for causing separation of the exhaust stream attachment to the upper surface 30 is illustrated in FIGS. 2 through 4. A series of small spaced apart ducts 32, 34, 36, 38, 40 and 42 are built into the body of wing 14 which, if unobstructed, would allow a flow of air to pass through the wing 14 from the high pressure lower wing surface 44 to the low pressure upper wing surface 30. As seen in FIG. 4, the ducts extend laterally behind the engine 24 and are aligned in series between the engine and a rear edge of the wing so as to open at the upper wing surface 30 along the path of the exhaust stream 28. However, a series of elongated rotary valves 46, 48, 50, 52, 54 and 56 having elongated passages therethrough are mounted in the wing within respective ones of the ducts 32, 34, 36, 38, 40 and 42 and are individually rotatable by suitable conventional drive mechanisms 58 (FIG. 4) for opening and closing the ducts to control the flow of air therethrough. Although other conventional types of drives and valves may be utilized, the drive mechanisms and valves may take the form disclosed and illustrated in U.S. Pat. No. 4,074,568 by the same applicant herein.

For maximizing horizontal thrust and thereby forward acceleration of the aircraft 10 during the initial portion of takeoff, valves 52, 54 and 56 (or some other suitable combination of the valves) would be rotated to the opened orientation. In the specific combination of FIG. 3, valves 46, 48 and 50 remain closed. In this particular case, flow of air is free to pass through ducts 38, 40 and 42 from the lower surface 44 to the upper surface 30 of the wing 14. In such case, separation of the exhaust stream 28 from the upper wing surface 30 occurs starting at approximately the region of the upper wing surface remote from the engine 24, such as the rear edge of the wing 14, and progressing forwardly along the upper surface 30 toward the engine 24 to the position of the opening of the duct 38 to the upper wing surface. At the instance during takeoff when additional lift is desired, the valves 52, 54 and 56 would be rotated to closed orientation, obstructing any further flow of air to the upper surface 30. Due to the curved configuration of the upper surface 30 of the wing 14, the exhaust stream 28 again achieves Coanda effect attachment to the upper surface 30 along its entire fore-to-aft length behind the engine 24 and is deflected toward the ground.

Consequently, by individually controlling the orientations of rotary valves 46, 48, 50, 52, 54 and 56, the position of introduction of airflow at the upper surface 30 and separation of the exhaust stream 28 from the upper surface 30 may be controlled, and hence the orientation of the resultant thrust vector 60 may be controlled. In comparison of FIGS. 2 and 3, it is seen that Coanda effect attachment and deflection of the exhaust stream 28 increases the vertical component 62 and decreases the horizontal component 64 of the thrust vector 60, while controlled separation or detachment of the exhaust stream 28 produces the opposite result, increases the horizontal component 64 and decreases the vertical component 62.

Figure 5:
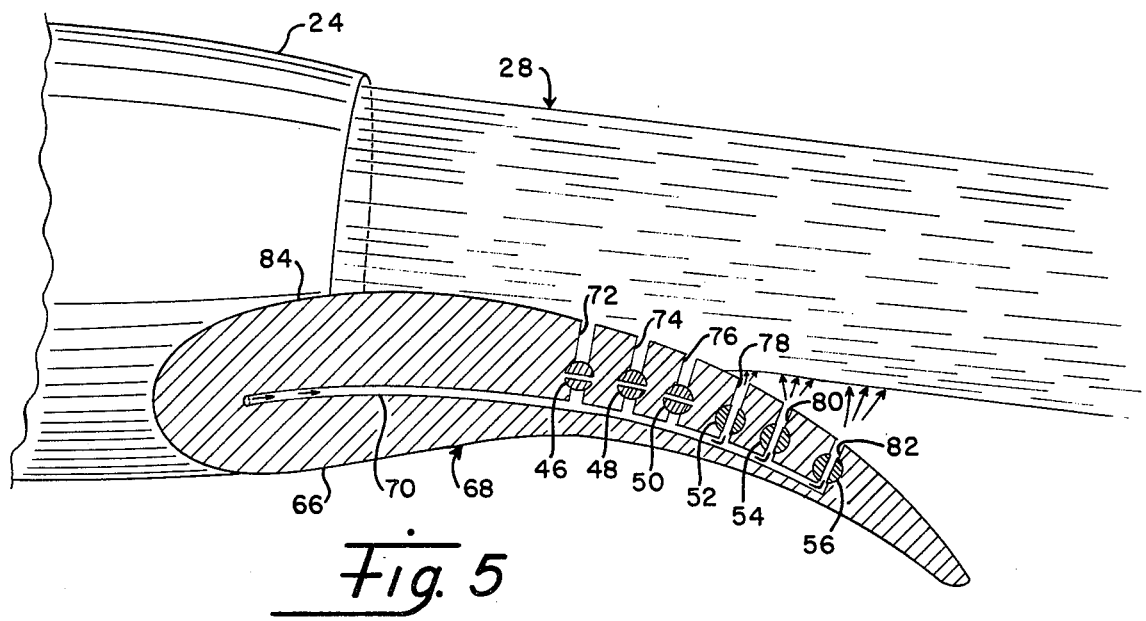
FIG. 5 is a side elevational view, partly in section, which is similar to FIG. 3, but depicting the second alternative embodiment of the Coanda effect attachment control features of the present invention when rendered operative.

A second alternative embodiment of the fluidic control features of the present invention which does not depend upon high pressure airflow on the lower side 66 of the wing 68 is shown in FIG. 5. In this case, a relatively small amount of high pressure air is bled from the jet engine 24 itself via a common duct 70 in the wing 68 which interconnects the engine exhaust with modified ducts 72, 74, 76, 78, 80 and 82 within the wing 68. By individually controlling the orientations of valves 46, 48, 50, 52, 54 and 56 (being identical to those in FIGS. 2 and 3), the position of introduction of airflow at the upper wing surface 84 may be selected and controlled. Thus, the position of separation of the exhaust stream 28 from the upper wing surface 84 can be controlled as in the case of the embodiment of FIGS. 2 and 3. The embodiment of FIG. 5 has the additional advantage of positive control in the sense that in the first embodiment of FIGS. 2 and 3 the airflow through the open ducts requires some forward velocity of the aircraft, while the FIG. 5 embodiment does not. However, a disadvantage of this second alternative embodiment of FIG. 5 is that some engine exhaust air is required and this would have an attendant thrust penalty. It is expected, though, that this penalty will be rather small since the required mass of airflow injected in the boundary layer on the upper wing surface to effectuate detachment will be small.

Figure 6:
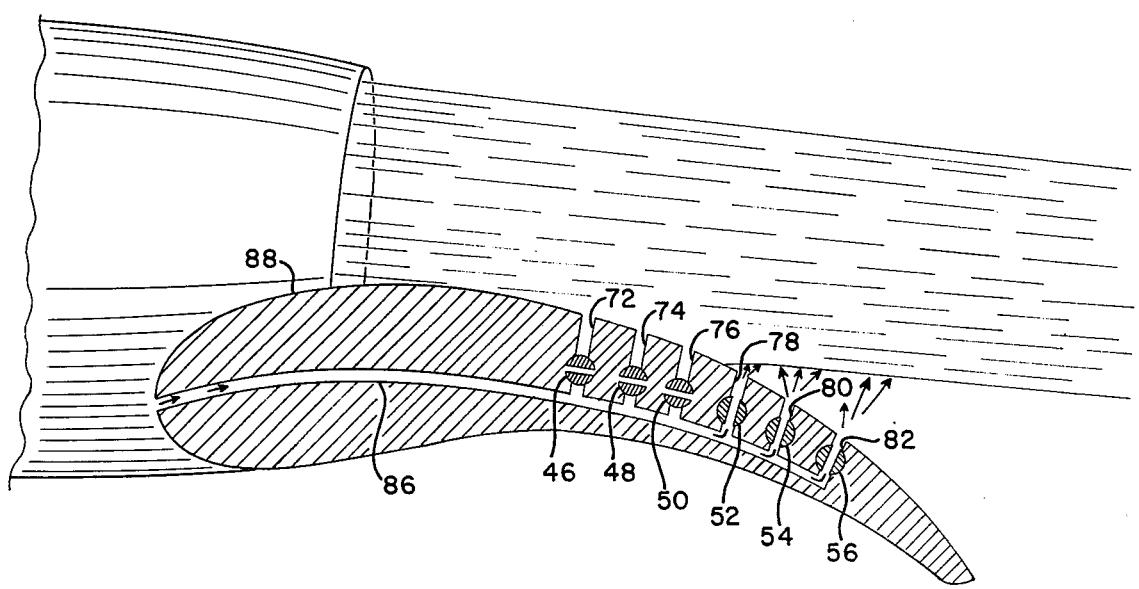
FIG. 6 is a side elevational view, partly in section, which is similar to FIGS. 3 and 5, but illustrating the third alternative embodiment of the Coanda effect attachment control features of the present invention when rendered operative.

A third alternative embodiment of the fluidic control features of the present invention shown in FIG. 6 is a variation of the second embodiment of FIG. 5. In this version, a common duct 86 in the wing 88 interconnects the leading edge of the wing 88 with ducts 72, 74, 76, 78, 80 and 82 (which are identical to those in FIG. 5), again allowing flow of air from a high pressure to a low pressure region by rotating individual valves 52, 54 and 56. As a slight modification the common duct could interconnect with some other edge regions of the wing.

To recapitulate, some of the advantages of the fluidic Coanda effect attachment control of the present invention for controlling the direction or orientation of the thrust vector of an engine exhaust stream are: (a) it is passive in the sense that it does not require a pressurized air supply; (b) the only moving parts, the rotating control valves, are very reliable and suffer practically no wear; (c) the valves require very little power to turn as opposed to moving wing flaps; (d) all components are inexpensive; and (e) rapid time response of the thrust vector to actuation of the control valves.

It is thought that the present invention and many of its attendant advantages will be understood from the foregoing description and it will be apparent that various changes may be made in the steps of the method, and form, constructed and arrangement of the parts of the apparatus, described without departing from the spirit and scope of the invention or sacrificing all of its material advantages, the forms hereinbefore described being merely preferred exemplary embodiments thereof.

Having thus described the invention, what is claimed is:

1. In a short takeoff and landing aircraft having at least one wing and a jet engine mounted above and forward of the wing so as to blow its exhaust stream over an upper surface of the wing, a method of controlling the direction of the thrust vector of the engine exhaust stream, comprising the steps of:
    (a) deflecting the exhaust stream of said engine over said upper surface of the wing and toward the ground by Coanda effect attachment of said exhaust stream to said upper surface, said deflecting of the exhaust stream increasing the vertical component and decreasing the horizontal component of the thrust vector of said engine exhaust stream and thereby increasing lift of said aircraft; and
    (b) controllably detaching said exhaust stream from said upper surface by introducing a flow of air between said exhaust stream and said upper surface at selected ones of a plurality of successive locations, spaced apart along said upper surface of said wing directly behind said engine and aligned in a series between the same and a rear edge of said wing, for varying the position, starting from a region of said upper surface near said rear edge of said wing and remote from said engine and progressing forwardly along said upper surface toward said engine, at which said exhaust stream becomes detached from said upper surface, said detaching of said exhaust stream increasing the horizontal component and decreasing the vertical component of the thrust vector of said engine exhaust stream and thereby increasing forward acceleration of said aircraft.

2. The method of controlling the thrust vector direction as recited in claim 1, wherein said flow of air is routed from a lower surface of said wing through a plurality of ducts corresponding to said selected ones of said plurality of successive locations along said upper surface.

3. The method of controlling the thrust vector direction as recited in claim 1, wherein said flow of air is routed from an edge of said wing through a plurality of ducts corresponding to said selected ones of said plurality of successive locations along said upper surface.

4. The method of controlling the thrust vector direction as recited in claim 1, wherein said flow of air is comprised by a small portion of said exhaust stream which is routed from said engine through a plurality of ducts corresponding to said selected ones of said plurality of successive locations along said upper surface.

5. In a short takeoff and landing aircraft having at least one wing and a jet engine mounted above and forward of the wing so as to blow its exhaust stream over the wing, apparatus for controlling the direction of the thrust vector of the engine exhaust stream, comprising:
    (a) an upper surface of said wing having a rearwardly and downwardly curved configuration for causing deflection of the exhaust stream of said engine along a curved path over said upper surface and toward the ground by Coanda effect attachment of said exhaust stream to said upper surface, said attachment increasing the vertical component and decreasing the horizontal component of the thrust vector of said engine exhaust stream and thereby increasing lift of said aircraft; and
    (b) means for controllably causing detachment of said exhaust stream from said upper surface by introducing a flow of air between said exhaust stream and said upper surface at selected ones of a plurality of successive locations, spaced apart along said upper surface of said wing directly behind said engine and aligned in a series between the same and a rear edge of said wing, for varying the position, starting from a region of said upper surface near said rear edge of said wing and remote from said engine and progressing forwardly along said upper surface toward said engine, at which said exhaust stream becomes detached from said upper surface, said detachment of said exhaust stream increasing the horizontal component of the thrust vector of said engine exhaust stream and thereby increasing forward acceleration of said aircraft.

6. The apparatus for controlling the thrust vector direction as recited in claim 5, wherein said means for controllably causing detachment of said exhaust stream from said upper surface of said wing includes:

a plurality of ducts interconnecting a lower surface of said wing to its upper surface for routing said flow of air from said lower surface to said plurality of successive locations along said upper surface of said wing;

means for opening and closing said ducts to control the flow of air therethrough and its introduction between said exhaust stream and upper surface of said wing at said selected ones of said plurality of locations therealong.

7. The apparatus for controlling the thrust vector direction as recited in claim 5, wherein said means for controllably causing detachment of said exhaust stream from said upper surface of said wing includes:

at least one duct interconnecting an edge of said wing to its upper surface through a plurality of ducts for routing said flow of air from said edge to said upper surface of said wing through the ones of said ducts corresponding to said selected one of said plurality of successive locations along said upper surface; and means for opening and closing said ducts of said plurality thereof to control the flow of air therethrough and its introduction between said exhaust stream and upper surface of said wing at said selected ones of said plurality of locations therealong.

8. The apparatus for controlling the thrust vector direction as recited in claim 5, wherein said means for controllably causing detachment of said exhaust stream from said upper surface of said wing includes:

at least one duct interconnecting said engine through said wing to said upper surface of said wing through a plurality of ducts for routing said flow of air in the form of a small portion of said exhaust stream from said engine to said upper surface of said wing through the ones of said ducts corresponding to said selected ones of said plurality of successive locations along said surface; and means for opening and closing said ducts to control the flow of air therethrough and its introduction between said exhaust stream and upper surface of said wing at said selected ones of said plurality of locations therealong.

9. The apparatus for controlling the thrust vector direction as recited in claims 6, 7 or 8 wherein said opening and closing means is comprised by a rotary valve disposed in each said duct.

* * * * *

UNITED STATES PATENT AND TRADEMARK OFFICE
CERTIFICATE OF CORRECTION

PATENT NO. : 4,392,621

DATED : July 12, 1983

INVENTOR(S) : Hermann Viets

It is certified that error appears in the above—identified patent and that said Letters Patent is hereby corrected as shown below:

Col. 8, line 2 (claim 7, line 9) delete "one" and insert --- ones ---.

Signed and Sealed this

Twenty-ninth Day of November 1983

[SEAL]

Attest:

GERALD J. MOSSINGHOFF

Attesting Officer     Commissioner of Patents and Trademarks